I. F. BROWN.
Improvement in Lubricating Loose Pulleys.
No. 126,261.  Patented April 30, 1872.
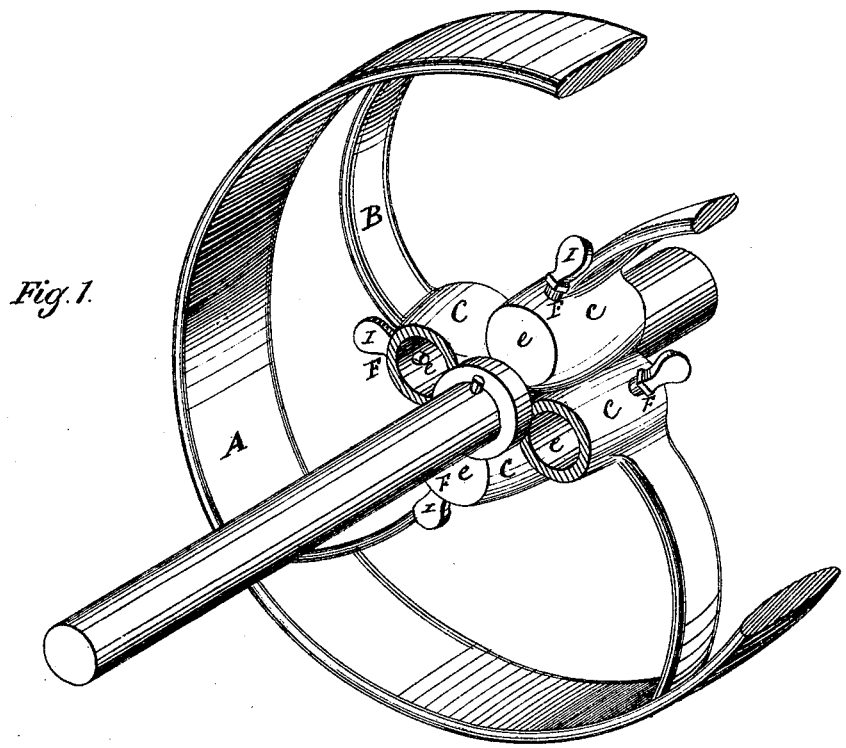
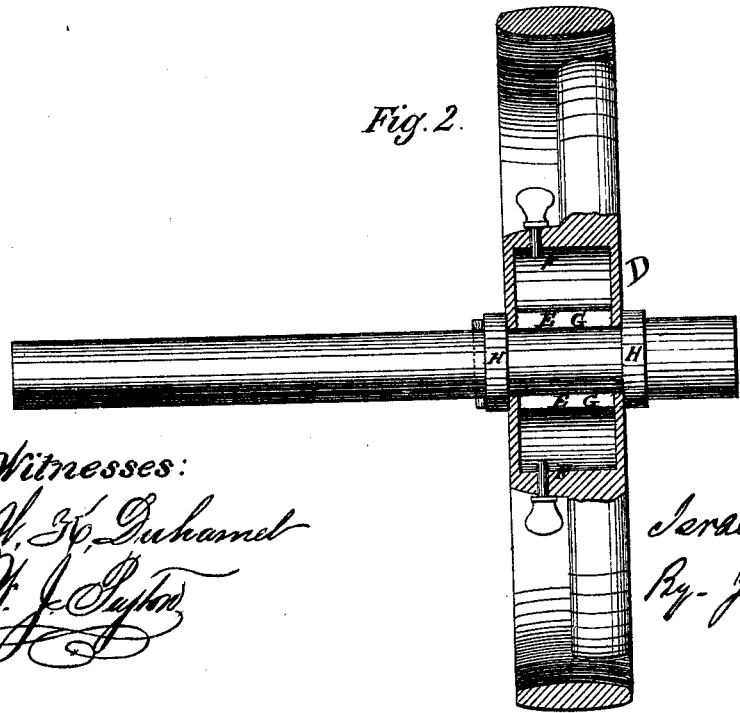

UNITED STATES PATENT OFFICE.

ISRAEL F. BROWN, OF NEW LONDON, CONNECTICUT.

IMPROVEMENT IN LUBRICATING LOOSE PULLEYS.

Specification forming part of Letters Patent No. 126,261, dated April 30, 1872.

*To all whom it may concern:*

Be it known that I, ISRAEL F. BROWN, of New London, county of New London, State of Connecticut, have invented a new and useful Improvement in Lubricating Pulleys or Wheels, of which the following is a specification:

This invention consists in so constructing the arms or spokes of the pulley, wheel, &c., that, by an enlargement of the same at or near its connection with the hub of the wheel or pulley by means of a core in casting it, a reservoir is created for the reception of any lubricating material or substance, which is conducted from the enlargement through a slot or duct onto the axle or shaft upon which the pulley or wheel revolves, into which cotton or wool or any other equivalent substance may be introduced, which will result in holding or keeping the lubricating substance in close contact with the journal and prevent a too rapid flow of oil, and at the same time collect all sediment that may be created and prevent its entering upon and grinding the bearings; and, further, the opening or aperture is covered by a screw-cap or thumb-screw, carrying a plate or disk upon its end inside of the oil-chamber, which, when forced down upon the oil, causes it to pass through the slot onto the axle or shaft, by which means the supply of oil is regulated.

In the drawing, Figure 1 is a perspective view of the wheel or pulley. Fig. 2 is a transverse section of the same.

Referring to the drawing, the letter A designates the rim of the wheel or pulley. B are the arms or spokes, which are formed upon the hub D, and are so connected or cast with the same at their point of union as to produce one or more enlargements or swells, *c c c*, which are hollow, as shown, so as to form the oil-chambers *e e e*. At the bottom of these enlargements, extending nearly through the hub, are formed slots G G, which conduct the oil or lubricating material from the chambers or reservoirs *e* upon the shaft or axle upon which the pulley or wheel revolves. The enlargements are provided with openings, as may be desired, said openings communicating with the reservoirs *e e*, by which means the latter are replenished. I is a thumb or set screw, working through the opening in the enlargement or swell *c*, and carries upon its inner end a disk or plate, so that when the said screw is forced down into the chamber *e* the lubricating material will be pressed through the slot G onto the axle or shaft. By this means the flow of the lubricating material upon the shaft is regulated. The chambers *e* will in some instances be provided with cotton-waste or other packing, so as to prevent a too rapid flow of oil, and to prevent sediment and other foreign matter being conveyed with the lubricating material upon the shaft or axle. The pulley or wheel is secured upon the axle or shaft in any desired manner—preferably by rings H H and a key—as shown.

Having thus described my invention, what I claim as new, and desire to secure by Letters Patent, is—

The inner ends of one or more of the arms B, formed with the enlargements *c* and chambers *e* upon the hub D, and provided with the slot G and regulating-screw I, carrying a plate inside the oil-chamber, substantially as and for the purpose set forth.

ISRAEL F. BROWN.

Witnesses:
    CHAS. W. BUTLER,
    ABIEL CONVERSE.